(12) United States Patent
Nagatsuka et al.

(10) Patent No.: US 7,904,201 B2
(45) Date of Patent: Mar. 8, 2011

(54) ROBOT PROGRAMMING DEVICE

(75) Inventors: Yoshiharu Nagatsuka, Yamanashi (JP); Kozo Inoue, Shizuoka (JP)

(73) Assignee: Fanuc Ltd, Yamanashi (JP)

( * ) Notice: Subject to any disclaimer, the term of this patent is extended or adjusted under 35 U.S.C. 154(b) by 861 days.

(21) Appl. No.: 11/461,888

(22) Filed: Aug. 2, 2006

(65) Prior Publication Data
US 2007/0032905 A1 Feb. 8, 2007

(30) Foreign Application Priority Data

Aug. 4, 2005 (JP) ................................. 2005-227015

(51) Int. Cl.
*G06F 19/00* (2006.01)
(52) U.S. Cl. ........................................ 700/245; 700/247
(58) Field of Classification Search .................... 700/245
See application file for complete search history.

(56) References Cited

U.S. PATENT DOCUMENTS

| | | | | |
|---|---|---|---|---|
| 4,495,453 A * | 1/1985 | Inaba et al. | ............. | 318/568.11 |
| 4,675,502 A * | 6/1987 | Haefner et al. | .......... | 219/124.34 |
| 4,744,500 A * | 5/1988 | Hatakeyama et al. | ......... | 228/4.1 |
| 4,917,369 A * | 4/1990 | Moll et al. | ..................... | 271/228 |
| 5,184,051 A * | 2/1993 | Schweiker et al. | ........ | 318/568.1 |
| 5,341,458 A * | 8/1994 | Kaneko et al. | ................. | 700/245 |
| 6,131,436 A * | 10/2000 | O'Bannon et al. | ................... | 73/7 |
| 6,519,507 B1 * | 2/2003 | Noguchi et al. | ............. | 700/264 |
| 2001/0047224 A1 * | 11/2001 | Hietmann et al. | ............ | 700/245 |
| 2002/0103567 A1 * | 8/2002 | Hishikawa et al. | ........... | 700/170 |
| 2002/0143435 A1 * | 10/2002 | Terada et al. | ................ | 700/245 |
| 2003/0103840 A1 * | 6/2003 | Mori et al. | ................. | 414/744.5 |
| 2003/0208302 A1 * | 11/2003 | Lemelson et al. | ............ | 700/245 |
| 2004/0128030 A1 * | 7/2004 | Nagata et al. | ................. | 700/245 |
| 2004/0257021 A1 * | 12/2004 | Chang et al. | ............. | 318/568.21 |
| 2005/0055132 A1 * | 3/2005 | Matsumoto et al. | .......... | 700/245 |
| 2005/0107919 A1 * | 5/2005 | Watanabe et al. | ............. | 700/245 |
| 2005/0273199 A1 * | 12/2005 | Ban et al. | ...................... | 700/248 |
| 2006/0069466 A1 * | 3/2006 | Kato et al. | .................... | 700/264 |

FOREIGN PATENT DOCUMENTS

| | | |
|---|---|---|
| EP | 0346839 A2 | 12/1989 |
| EP | 0523889 A2 | 1/1993 |
| EP | 0607619 A2 | 7/1994 |
| JP | 2-157906 A | 6/1990 |

(Continued)

OTHER PUBLICATIONS

Ishida H et al. "Two arc welding robots coordinated with 3-D vision sensor" Industrial Electronics, Control and Instrumentation, 1994. IECON 94., 20th International Conference on Bologna, Italy Sep. 5-9, 1994, New York, NY. pp. 830-834.

(Continued)

*Primary Examiner* — Khoi Tran
*Assistant Examiner* — Kyung J Kim
(74) *Attorney, Agent, or Firm* — Lowe Hauptman Ham & Berner LLP

(57) ABSTRACT

A robot programming device, in which the teaching of the cooperative motion of a plurality of robots may be carried out in a short time so as to reduce the number of man-hours for starting-up a robot system including the robots. The robot system includes two handling robots each having a hand for gripping a workpiece and a welding robot having a welding torch, a robot controller for controlling the robots, a personal computer with a robot programming device connected to the controller, and a teaching operation panel connected to the controller for teaching each robot.

11 Claims, 4 Drawing Sheets

FOREIGN PATENT DOCUMENTS

| | | |
|---|---|---|
| JP | 8-323665 A | 12/1996 |
| JP | 9-179612 A | 7/1997 |
| JP | 2001-088066 A | 4/2001 |
| JP | 2001-328087 A | 11/2001 |
| JP | 2003-340756 | 12/2003 |
| JP | 2003-340756 A | 12/2003 |
| JP | 2004-009279 | 1/2004 |
| JP | 2004-9279 A | 1/2004 |
| WO | 03/034165 A1 | 4/2003 |

OTHER PUBLICATIONS

H. Ishida et al., "*Two Arc Welding Robots Coodinated with 3-D Vision Sensor*," Industrial Electronics, Control and Instrumentation, 1994. IECON 94., 20$^{th}$ International Conference on Bologna, Italy Sep. 5-9, 1994, New York, NY, pp. 830-834.

Office Action for EP 06015989 dated Feb. 22, 2010.

* cited by examiner

ROBOT PROGRAMMING DEVICE

BACKGROUND OF THE INVENTION

1. Field of the Invention

The present invention relates to a device for programming the cooperative motion of a plurality of robots.

2. Description of the Related Art

In an arc welding process or a trimming process on a workpiece having a complicated shape, a plurality of robots (for example, two robots) may be cooperatively controlled. In the teaching of the cooperative control, the robots are moved one-by-one, so as to determine a taught position of each robot, by means of an operating panel or the like. Alternatively, two robots may be simultaneously moved by using a cooperative jog function. For example, Japanese Unexamined Patent Publication No. 2004-9279 discloses a welding robot system in which a welding robot and a positioner are cooperatively controlled. Also, Japanese Unexamined Patent Publication No. 2003-340756 discloses a robot controller in which a plurality of robots are taught in parallel by a plurality of operators so as to reduce the time of teaching.

When a plurality of robots are moved one-by-one, a jog operation for each robot must be carried out gradually, from the viewpoint of cooperation of the robots. Therefore, the operation takes a long time. On the other hand, when the cooperative jog function is used, two robots may be simultaneously moved. However, a teaching operation for a complicated process, such as arc welding or trimming in three-dimensional space, must be carried out by a person highly skilled in the art and also takes a long time. Also, in general, the cooperative jog function can be applied to only two robots. Therefore, if three or more robots are necessary, much more time is necessary for the teaching operation. As described above, as the teaching operation needs a long time, the starting-up of a robot system including the robots also takes a long time or many man-hours.

SUMMARY OF THE INVENTION

Accordingly, it is an object of the present invention to provide a robot programming device in which the teaching of cooperative motion to a plurality of robots may be carried out in a short time so as to reduce the number of man-hours for starting-up a robot system including the robots.

To this end, according to the present invention, there is provided a robot programming device for a robot system including a handling robot having a hand for gripping a workpiece and a processing robot cooperatively moved with the handling robot and having a work tool for processing the workpiece, the robot programming device making a motion program for the handling robot and the processing robot, the robot programming device comprising: a display means for indicating three-dimensional images of the handling robot, the hand, the processing robot, the work tool and the workpiece; a means for specifying the condition of the movement of the workpiece; a means for specifying the positional relation between the workpiece and the hand; a means for determining the position and the motion of the handling robot based on the condition of the movement of the workpiece and the positional relation between the workpiece and the hand; a means for specifying a site on the workpiece to be processed; a means for determining the position and the motion of the processing robot based on the condition of the movement of the workpiece and the position of the site on the workpiece to be processed; and a means for making a motion program for the handling robot and the processing robot based on the determined positions and motions of the handling robot and the processing robot.

It is preferable that the means for determining the position and the motion of the handling robot changes the determined position of the handling robot and checks again the possibility of the motion of the handling robot at a changed position, when the determined motion of the handling robot at the determined position is judged to be inappropriate.

It is also preferable that the means for determining the position and the motion of the processing robot changes the determined position of the processing robot and checks again the possibility of the motion of the processing robot at a changed position, when the determined motion of the processing robot at the determined position is judged to be inappropriate.

The robot programming device may further comprise a means for calculating the positional relation between the workpiece and the hand based on the position of the center of gravity and the three-dimensional shape of the workpiece.

BRIEF DESCRIPTION OF THE DRAWINGS

The above and other objects, features and advantages of the present invention will be made more apparent by the following description, of preferred embodiments thereof, with reference to the accompanying drawings, wherein:

FIG. 7b is a schematic diagram of a lattice used in the configuration of FIG. 7a;

DETAILED DESCRIPTIONS

Figure 1:
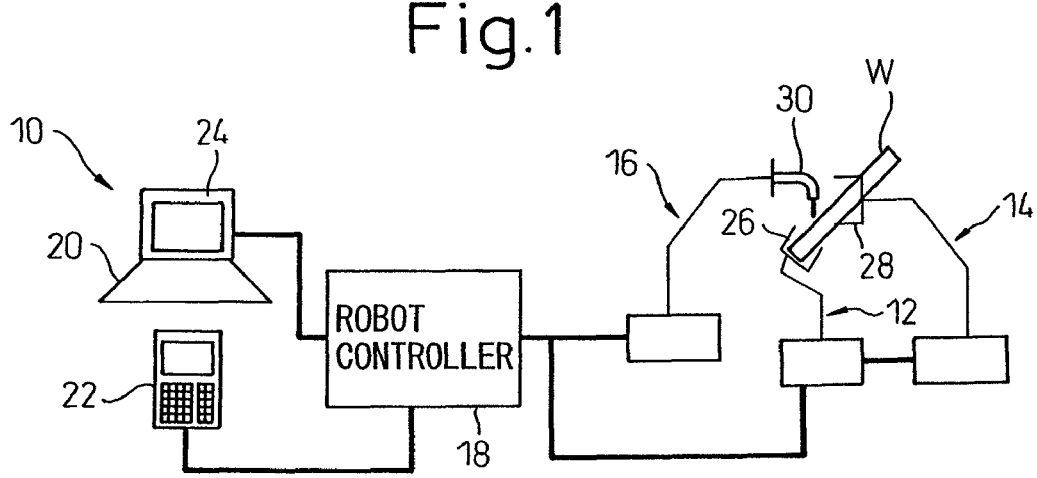
FIG. 1 is a schematic diagram of a basic constitution of a robot system including a robot programming device according to the invention.

The present invention will be described below with reference to the drawings. FIG. 1 is a schematic diagram of a basic constitution of a robot system 10 to which a robot programming device according to the invention may be applied. The robot system 10 includes two handling robots 12 and 14 each having a hand for gripping an object to be processed or a workpiece W. The robot system 10 also includes a welding robot 16 for processing (welding in this case) the workpiece W, a robot controller 18 for controlling the robots 12, 14 and 16, an input device such as a personal computer 20 connected to the controller 18, and a teaching operation panel 22, connected to the controller 18, for teaching the robots 12, 14 and 16. In this embodiment, each means included in the programming device of the invention is incorporated in the personal computer 20. However, it is obvious that another constitution of the means may be possible.

Figure 2:
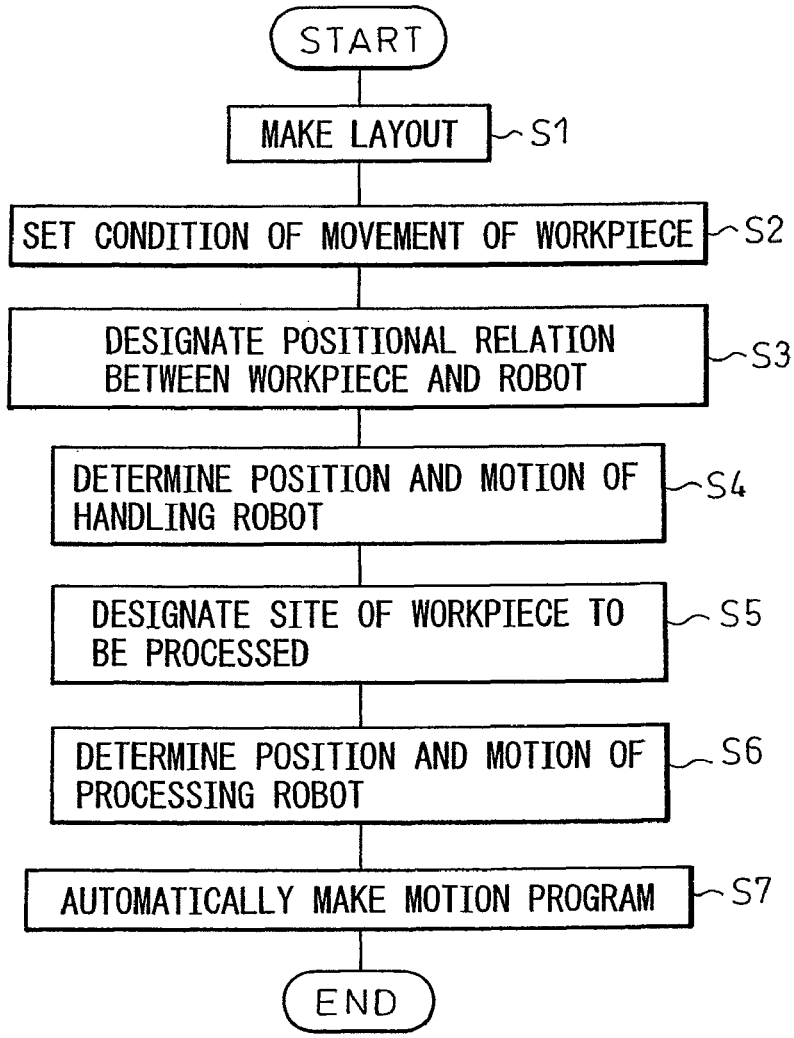
FIG. 2 is a flowchart showing a procedure of the robot programming device.

FIG. 2 is a flowchart showing a procedure by means of the robot programming device. Hereinafter, the invention is explained with reference to the drawings regarding steps S1 to S7 of FIG. 2.

Figure 3:
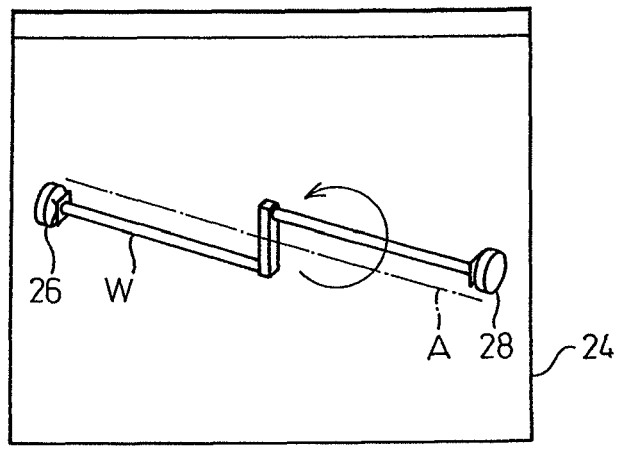
FIG. 3 shows the positional relation between a workpiece and a hand of a robot.

First, as shown in FIG. 3, three-dimensional models corresponding to a workpiece to be processed (or welded), hands 26 and 28 for gripping the workpiece W are selected and displayed on a display means such as a display 24 of the personal computer 20 (step S1).

Next, as shown in FIG. 3, the condition of the movement of the workpiece W is set (step S2). In the embodiment, the workpiece W may be rotated about a rotation axis A. Further, in step 3, the positional relation between the hands 26, 28 and the workpiece W (concretely, the handling or gripping positions of the workpiece by the hands 26, 28) is set such that the condition set in step S2 is satisfied. In this case, both ends of the workpiece W are held by the hands 26 and 28, which are automatically determined, as described below.

Figure 4:
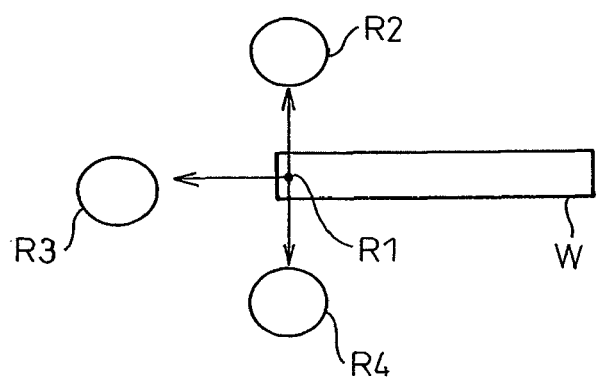
FIG. 4 is a diagram in relation to the determination of the position of a handling robot.

Then, the locations and the motions of the handling robots 12 and 14 are determined (step S4). At this point, the three-dimensional positions of the robots may be inputted by an operator via the computer, otherwise, they may be automatically determined based on data set in steps S2 and S3. In the latter case, the location may be determined in view of the stroke of each robot and/or interference between the workpiece and each robot. Concretely, as shown in a plain view of FIG. 4, when the position of the workpiece W handled by the handling robot 12 is set on the position R1, some candidate positions where the robot 12 may be located (the positions R2 to R4 in this case) are selected. Then, among the candidate positions, one or more positions where the robot 12 does not interfere with external equipments when the robot 12 is operated according to the condition of the movement set in step S2 are selected and a margin of the stroke of the robot 12 in the position is calculated. In other words, when interference may occur in one candidate position, the position is changed to another candidate position and the possibility of interference is checked again. On the other hand, when interference cannot occur in one candidate position, the margin of the stroke is calculated. In this way, one of the candidate positions where the handling robot 12 may have the largest margin of the stroke is selected as the final location of the robot 12 and, the motion of the robot at the position is used for programming of a motion program. The above procedure is also applied to the other handing robot 14.

Figure 5:
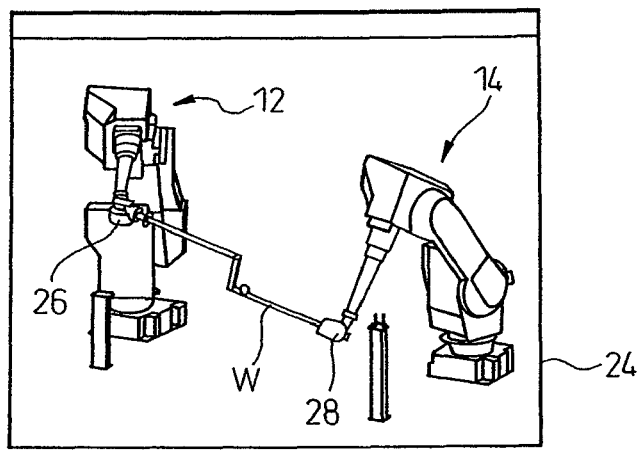
FIG. 5 shows an example of the layout of the handling robot.

In addition, if the largest margin of the stroke may be obtained in a plurality of candidate positions, one position, where the area of installation of the robots is smallest (for example, the distance between the robots 12 and 14 is shortest), is selected. Contrarily, one of the candidate positions, where the robot has the largest margin among a plurality of candidate positions where the area of installation of the robots is smallest, may be selected. FIG. 5 shows a thus selected example of the layout of the handling robots 12 and 14.

Figure 6:
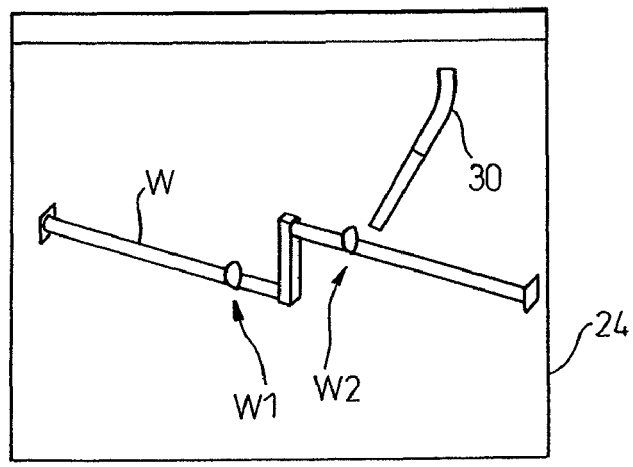
FIG. 6 shows a site on the workpiece to be processed.

In the next step S5, as shown in FIG. 6, a welding site on the workpiece W (two sites W1 and W2, in this case) and the welding condition is designated. As the welding condition, in the case of arc welding, a targeting angle, an angle of advance and a welding speed, etc., are possible.

Figure 7A:
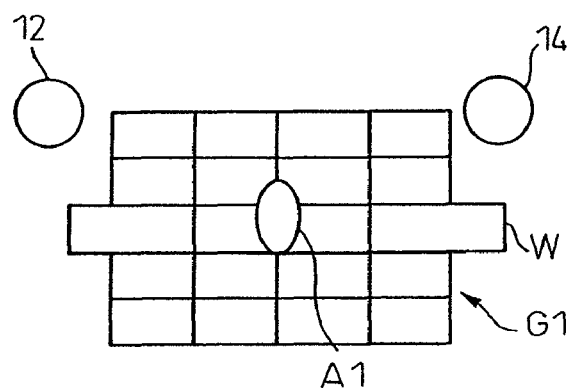
FIG. 7a is a diagram in relation to the determination of the position of a processing robot.
Figure 7B:
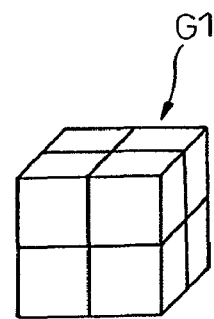

Next, in step S6, the position and the motion of the welding robot 16 are determined. At this point, the three-dimensional positions of the robots may be inputted by an operator via a computer, otherwise, they may be automatically determined based on data set in steps S2 to S5. In the latter case, the location may be determined in view of the stroke of the welding robot and/or interference between the workpiece and the robot. Concretely, as shown in FIGS. 7a and 7b, when a site or area of the workpiece W to be weleded is set at position A1, some candidate positions where the welding robot 16 may be located are selected. In this case, the candidate positions are lattice points of a lattice G1 (FIG. 7b) defined in three-dimensional space. First, as shown in FIG. 7a, the welding site A1 is positioned at the center of the lattice G1. Then, among the candidate positions, one or more positions, where the welding robot 16 does not interfere with the handling robot 12 or 14 when the robots 12 and 14 positioned at the positions set in step S5 and operated according to the condition of the movement set in step S2 are selected and a margin of the stroke of the robot 16 in the position is calculated. In other words, when interference may occur in one lattice point, the position of the robot 16 is changed to another lattice point and the possibility of interference is checked again. On the other hand, when interference cannot occur in one lattice point, the margin of the stroke is calculated. In this way, one lattice point of the lattice G1 where the welding robot 16 may have the largest margin of the stroke is selected as the final location of the robot 16 and the motion of the robot at the point is used for programming of a motion program.

Figure 8:
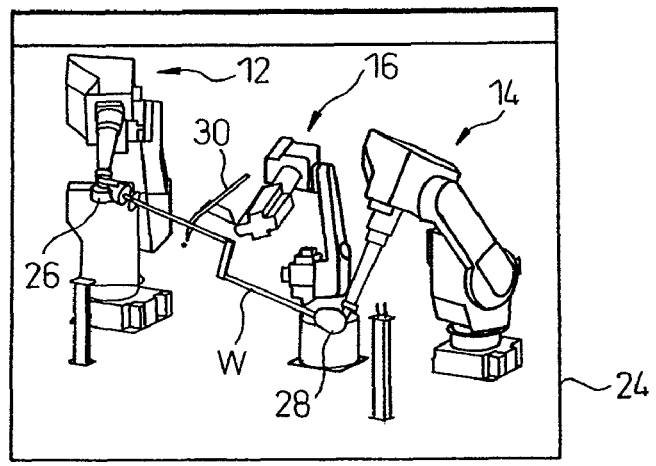
FIG. 8 shows an example of the layout of the processing robot.

In addition, if the largest margin of the stroke may be obtained in a plurality of candidate positions or lattice points, one of the candidate positions, where the area of installation of the whole robot system is smallest (for example, the distance between the welding robot 16 and each handling robot 12, 14 is shortest), is selected. Contrarily, one of the candidate positions, where the robot 16 has the largest margin among a plurality of candidate positions where the area of installation of the robot system is smallest, may be selected. FIG. 8 shows a thus selected example of the layout of the welding robot 16, as well as the handling robots 12 and 14.

After the position and the motion of each of the robots are determined according to the above steps S1 to S6, the robot programming device automatically makes a robot program for the cooperative motion of the robots in step S7. When the process is a welding process, as in the embodiment, the program includes commands for activating each axis of the robots and starting and stopping the arc welding. An example of the robot program is described below:

| An example of robot program | | |
|---|---|---|
| 1: Each Axis | 100% | P[1]; |
| 2: Each Axis | 100% | P[2]; |
| 3: Straight | 500 mm/sec | P[3]; |
| 4: Straight | 500 mm/sec | P[4] Arc Start; |
| 5: Straight | 500 mm/sec | P[5]; |
| 6: Straight | 500 mm/sec | P[6]; |
| 7: Straight | 500 mm/sec | P[7]; |
| 8: Straight | 500 mm/sec | P[8]; |
| 9: Straight | 500 mm/sec | P[9] Arc End; |
| 10: Straight | 500 mm/sec | P[10]; |
| 11: Each Axis | 100% | P[2]; |
| 12: Each Axis | 100% | P[1]; |

Figure 9:
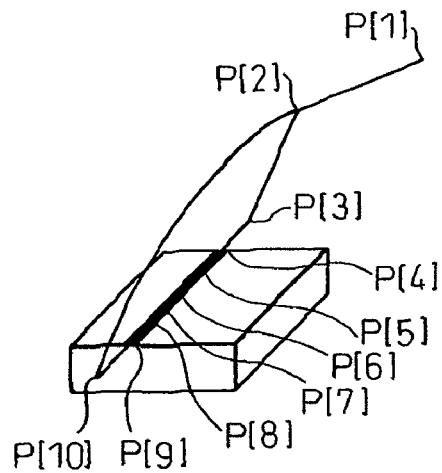
FIG. 9 shows the position of a welding torch relative to the workpiece during a welding operation by the robot system.

Next, the above program example is briefly explained with reference to FIG. 9. First, by the motion of each axis of the robot, the workpiece W is moved such that the position of the workpiece W relative to a welding torch 30 (FIG. 1) of the welding robot 16 is positioned at a teaching point P[1]. At this point, the condition "100%" means that each axis of the robots 12 and 14 is activated at the maximum speed thereof. The workpiece is moved to a teaching point P[2] for avoiding interference and, then, moved to a teaching point P[3] just before a welding start point. From the point P[3], the workpiece W is straightly moved at a predetermined welding speed (500 mm/sec, in this case). During the straight movement, the welding process by the welding robot 16 starts after a teaching point P[4]. The welding terminates when the workpiece reaches a welding end point P[9] via predetermined teaching points P[5] to P[8]. The workpiece is further moved to a teaching point P[10] without changing the speed. After the point P[10], the workpiece is returned to the point P[1] by the motion of each axis.

In the case of a plurality of robots (for example, handling and processing robots) being cooperatively operated, as in this embodiment, each teaching point includes position data of the handling and processing robots. For example, the teaching point P[1] includes the position (W, Y, Z, W, P, R) of the handling robot (having six axes) and the position (W, Y, Z, W, P, R) of the welding robot. In addition, although this embodiment relates to the robot system for arc welding, the invention may be applied to a robot system for trimming.

Figure 10:
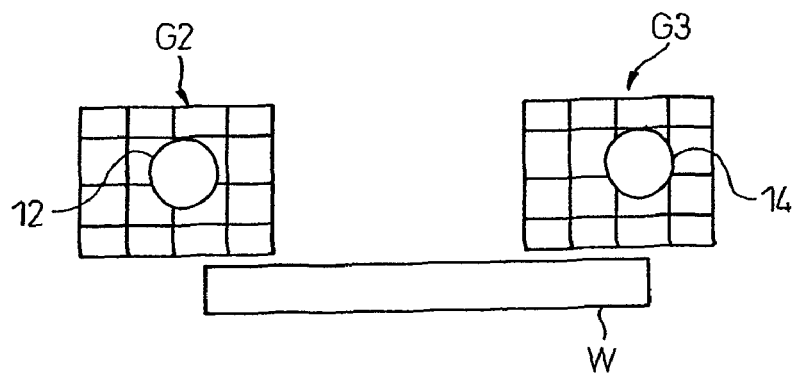
FIG. 10 is a diagram in relation to the automatic correction of the position of the handling robot.

The flowchart as shown in FIG. 2 may further have a step, for example, after step S7, for correcting the position of the handling robots. In this step, as shown in FIG. 10, for example, lattices G2 and G3 including the handling robots 12 and 14, respectively, are defined in three-dimensional space. Previously, the handling robots 12 and 14 are positioned at the centers of the lattices G2 and G3, respectively. In this case, the candidate positions of the handling robots may be lattice points of the lattice G2 and G3. Then, among the candidate positions, one or more positions, where each of the robots 12 and 14 does not interfere with external equipment when the robots are operated according to the set condition of the movement of the workpiece W, are selected and the margins of the strokes of the robots 12 and 14 at the positions are calculated. In this way, the candidate position where interference may occur is excluded as an inappropriate position and one of the candidate positions where each handling robot may have the largest margin of the stroke is selected as the final location of each robot.

In addition, if the largest margin of stroke is obtained in a plurality of candidate positions or lattice points, one of the candidate positions, where the area of installation of the whole robot system is smallest (for example, the distance between the handling robots is shortest), is selected. Contrarily, one of the candidate positions, where each of the handling robots has the largest margin among a plurality of candidate positions where the area of installation of the robot system is smallest, may be selected.

Figure 11:
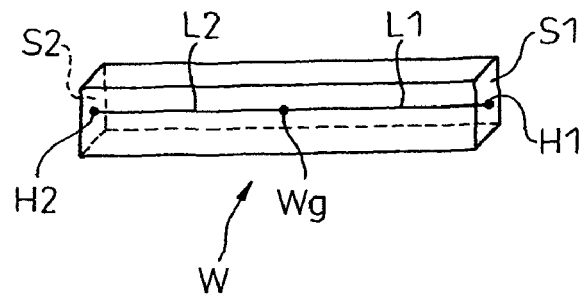
FIG. 11 shows a diagram relating to the calculation of the part of the workpiece to be handled.

FIG. 11 is a diagram showing a procedure for determining the handling position of the workpiece based on the three-dimensional shape of the workpiece. When the workpiece has a columnar shape as shown in FIG. 11, for example, one handling surface (end surface) S1 of the workpiece is designated. Then, a straight line L1, extending from the center of gravity Wg of the workpiece and perpendicular to the handling surface S1, intersects with the handling surface S1 at an intersecting point H1. Similarly, a straight line L2, extending from the center of gravity Wg and perpendicular to a handling surface S2 opposite to the handling surface S1, intersects with the handling surface S2 at an intersecting point H2. In this case, the intersecting points H1 and H2 are defined as handling points of the workpiece W. At this point, if the workpiece has another shape and the handling surface S2 does not exist or is inappropriate as the handling surface, the previously defined handling surface S1 is changed to another surface of the workpiece. This process may be executed automatically.

According to the robot programming device of the present invention, teaching of the cooperative motion of a plurality of robots and programming of each robot may be automatically carried out. Therefore, the number of man-hours for teaching, programming and/or adjusting in the field may be greatly reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot programming device, for a robot system including a handling robot having a hand for gripping a workpiece and a processing robot cooperatively moved with the handling robot and having a work tool for processing the workpiece, the robot programming device making a motion program for the handling robot and the processing robot, the robot programming device comprising:
a display part which indicates three-dimensional images of the handling robot, the hand, the processing robot, the work tool and the workpiece;
a movement condition specifying part which specifies a condition of the movement of the workpiece by the handling robot;
a positional relation specifying part which specifies a positional relation between the workpiece and the hand;
a first candidate setting part configured to set a plurality of candidate positions locations of the handling robot;
a first selecting part configured to select one or more location among the plurality of candidate locations of the handling robot where the handling robot does not interfere with another article when the handling robot is operated according to the condition of the movement of the workpiece and a positional relation between the workpiece and the hand, and determines a motion of the handling robot based on the selected location;
a site specifying part which specifies a site on the workpiece to be processed;
a second candidate setting part configured to set a plurality of candidate locations of the processing robot;
a second selecting part configured to select one or more locations of the processing robot among the plurality of candidate locations where the processing robot does not interfere with another article when the processing robot is operated according to the condition of the movement of the workpiece and the position of the site on the workpiece to be processed, and determines the motion of the processing robot based on the selected location; and
a program making part which makes the motion program for the handling robot and the processing robot based on the selected locations and determined motions of the handling robot and the processing robot.

2. The robot programming device as set forth in claim 1, wherein the first selecting part for the handling robot changes the determined location of the handling robot to another candidate location and checks again the possibility of the motion of the handling robot at a changed location, when the determined motion of the handling robot at the determined location is judged to be inappropriate.

3. The robot programming device as set forth in claim 1, wherein the second selecting part for the processing robot changes the determined location of the processing robot to another candidate location and checks again the possibility of the motion of the processing robot at a changed location, when the determined motion of the processing robot at the determined location is judged to be inappropriate.

4. The robot programming device as set forth in claim 2, wherein the second selecting part for the processing robot changes the determined location of the processing robot to another candidate location and checks again the possibility of the motion of the processing robot at a changed location, when the determined motion of the processing robot at the determined location is judged to be inappropriate.

5. The robot programming device as set forth in claim 1, wherein the first selecting part for the handling robot selects a candidate location among the plurality of candidate locations of the handling robot where the area of installation of the handling robot is minimized.

6. The robot programming device as set forth in claim 1, wherein the second selecting part for the processing robot selects a candidate location among the plurality of candidate locations of the processing robot where the area of installation of the robot system is minimized.

7. The robot programming device as set forth in claim 5, wherein the second selecting part for the processing robot selects a candidate location among the plurality of candidate locations of the processing robot where the area of installation of the robot system is minimized.

8. The robot programming device as set forth in claim 1, wherein the first selecting part for the handling robot calculates a margin of a stroke of the handling robot in each candidate location and selects a candidate location among the plurality of candidate locations of the handling robot where the handling robot has the maximum margin of the stroke.

9. The robot programming device as set forth in claim 1, wherein the second selecting part for the processing robot calculates a margin of a stroke of the processing robot in each candidate location and selects a candidate location among the plurality of candidate locations of the processing robot where the processing robot has the maximum margin of the stroke.

10. The robot programming device as set forth in claim 8, wherein the second selecting art for the processing robot calculates the margin of the stroke of the processing robot in each candidate location and selects a candidate location among the plurality of candidate locations of the processing robot where the processing robot has the maximum margin of the stroke.

11. The robot programming device as set forth in claim 1, wherein the first and second selecting parts select candidate locations among the plurality of candidate locations of the handling robot and the processing robot, respectively, so that an entire area of installation of the robot system is minimized.

* * * * *